J. WALKER.
WIRE CLAMP.
APPLICATION FILED OCT. 11, 1916.
1,220,912. Patented Mar. 27, 1917.
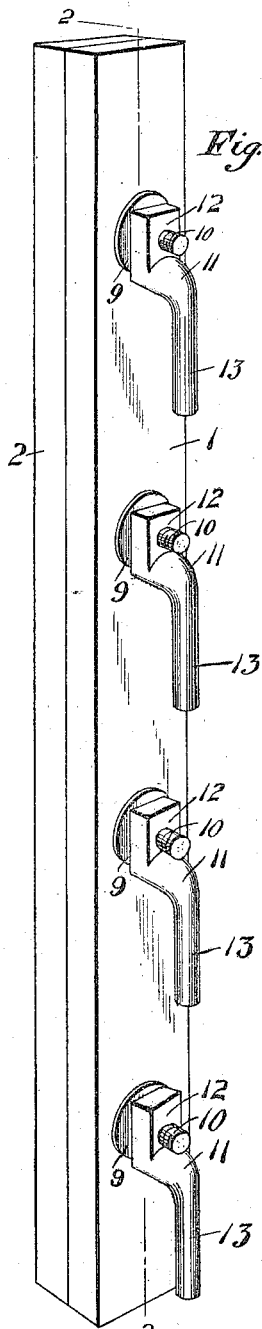
Fig. 1.
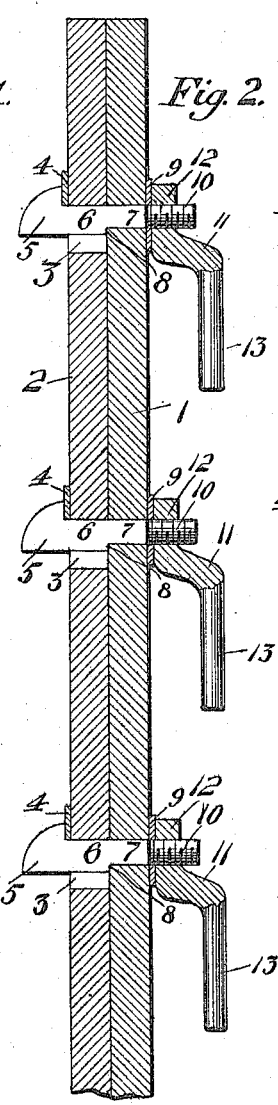
Fig. 2.
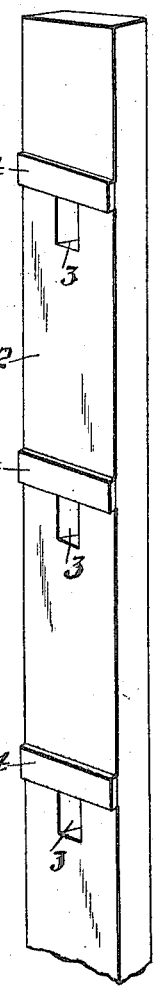
Fig. 3.
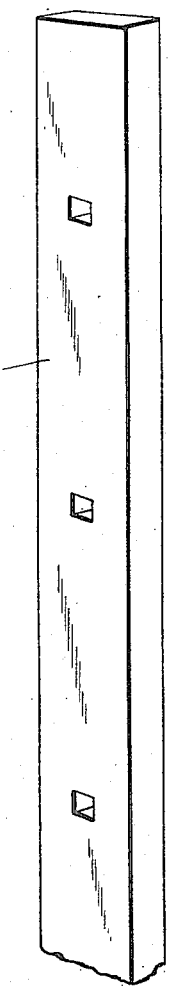
Fig. 4.
Fig. 5.
Witnesses
R. E. Rousseau
T. L. Mochanie
Inventor
John Walker.
By Victor J. Evans
Attorney

UNITED STATES PATENT OFFICE.

JOHN WALKER, OF WOLF LAKE, ILLINOIS.

WIRE-CLAMP.

1,220,912. Specification of Letters Patent. Patented Mar. 27, 1917.

Application filed October 11, 1916. Serial No. 125,042.

*To all whom it may concern:*

Be it known that I, JOHN WALKER, a citizen of the United States, residing at Wolf Lake, in the county of Union and State of Illinois, have invented new and useful Improvements in Wire-Clamps, of which the following is a specification.

This invention relates to wire clamps.

The object of the invention is to provide a clamp by means of which the ends of wires may be quickly and securely clamped or easily released.

Various other objects and advantages of the invention will appear from the following description when taken in connection with the accompanying drawings.

In the drawings;

Figure 1 is a perspective view of a wire clamp constructed in accordance with the present invention;

Fig. 2 is a detailed longitudinal sectional view taken on the line 2—2 of Fig. 1;

Fig. 3 is a detailed perspective view of one of the clamping members;

Fig. 4 is a detailed perspective view of the other clamping member; and

Fig. 5 is a detailed perspective view of the hook.

As illustrated in the drawings the invention consists of a pair of opposed clamping members designated by the numerals 1 and 2. These members may be constructed of any suitable material such as metal or wood, wooden members however being preferred.

The clamping member 2 is provided with a series of elongated openings 3, there being preferably four of these openings, however any suitable number may be used. Reinforcing strips of metal 4 are preferably provided at one edge of the openings to prevent wear due to the engagement of hooks 5. These hooks are provided with a shank 6 preferably of ordinary form, the said shank being reduced as at 7 and having a shoulder 8 formed thereon. The clamping member 1 is provided with a series of openings adapted to register with openings 3, and the reduced portion 7 of the shank of the hook is adapted to be received within these openings, while the shoulder 8 limits the movement of the shank therethrough. Washers 9 are provided for the threaded ends 10 of the hook, a clamping lever 11 being adapted to be threaded thereon.

For this purpose the lever is provided with a threaded nut portion 12 and an operating handle 13 for the ready manipulation of the same. From the foregoing description when taken in connection with the accompanying drawings it will be seen that the invention provides a ready and positive clamp for wire and one that may be applied or removed with ease.

Having thus described the invention what I desire to claim and secure by Letters Patent is:

A clamp comprising a pair of elongated clamping members provided with smooth contacting surfaces, one of said members being provided with elongated openings, raised reinforcing edges for said openings, the other member having substantially rectangular openings therein, hooks provided with a shank portion adapted to snugly fit the rectangular openings and having free vertical movement within the elongated openings, the said hooks engaging the reinforcing edges of the slots when the clamping member is in operative position, a shoulder formed upon the shank of said hook for engagement with one of the clamping members and a threaded lever for engagement with the threaded portion formed upon the end of the hook shank.

In testimony whereof I affix my signature.

JOHN WALKER.

Copies of this patent may be obtained for five cents each, by addressing the "Commissioner of Patents, Washington, D. C."